US010846750B2

(12) United States Patent
Shaw et al.

(10) Patent No.: US 10,846,750 B2
(45) Date of Patent: Nov. 24, 2020

(54) MOBILE INTERSTITIAL ADS

(71) Applicant: Google LLC, Mountain View, CA (US)

(72) Inventors: Satyam Shaw, Sunnyvale, CA (US); Ravi Jain, Palo Alto, CA (US); Surojit Chatterjee, Fremont, CA (US)

(73) Assignee: Google LLC, Mountain View, CA (US)

( * ) Notice: Subject to any disclaimer, the term of this patent is extended or adjusted under 35 U.S.C. 154(b) by 20 days.

(21) Appl. No.: 15/958,630

(22) Filed: Apr. 20, 2018

(65) Prior Publication Data

US 2018/0240156 A1 Aug. 23, 2018

Related U.S. Application Data

(63) Continuation of application No. 14/012,500, filed on Aug. 28, 2013, now Pat. No. 9,953,345, which is a continuation of application No. 13/165,686, filed on Jun. 21, 2011, now Pat. No. 8,548,848.

(51) Int. Cl.
*G06Q 30/00* (2012.01)
*G06Q 30/02* (2012.01)

(52) U.S. Cl.
CPC ......... *G06Q 30/0267* (2013.01); *G06Q 30/00* (2013.01); *G06Q 30/0241* (2013.01); *G06Q 30/0276* (2013.01); *G06Q 30/0277* (2013.01)

(58) Field of Classification Search
CPC ........... G06Q 30/0267; G06Q 30/0277; G06Q 30/0276; G06Q 30/0241; G06Q 30/00
USPC ...................................................... 705/14.64
See application file for complete search history.

(56) References Cited

U.S. PATENT DOCUMENTS

| | | | |
|---|---|---|---|
| 5,737,619 A * | 4/1998 | Judson | G06F 16/957 715/236 |
| 6,275,850 B1 * | 8/2001 | Beyda | G06Q 10/107 358/402 |
| 6,314,451 B1 | 11/2001 | Landsman et al. | |
| 6,609,146 B1 * | 8/2003 | Slotznick | G06F 9/4843 709/200 |
| 6,699,188 B2 * | 3/2004 | Wessel | A61B 5/04325 600/300 |
| 6,934,735 B1 * | 8/2005 | Emens | H04L 67/325 709/203 |
| 7,765,481 B2 | 7/2010 | Dixon et al. | |
| 8,548,848 B1 | 10/2013 | Shaw et al. | |

(Continued)

OTHER PUBLICATIONS

"Walmart and Google to offer voice-enabled shopping", BBC News, Aug. 23, 2017 (10 pages).

(Continued)

*Primary Examiner* — Luis A Brown
(74) *Attorney, Agent, or Firm* — Foley & Lardner LLP

(57) ABSTRACT

Systems and methods for pre-loading and displaying intervening content, such as advertisements, on a mobile device during latency periods, such as when an advertiser landing page is requested by that device, are provided herein. Intervening content may be pre-loaded on to the device and associated with one or more particular advertisements such that selecting/interacting with the associated advertisement triggers intervening content display during known or detected periods of latency. In some cases, a latency threshold or thresholds may determine one or more types of content to present, and/or a content presentation sequence.

16 Claims, 4 Drawing Sheets

(56) References Cited

U.S. PATENT DOCUMENTS

| | | | |
|---|---|---|---|
| 8,914,524 B1* | 12/2014 | Anderson | H04L 67/1095 709/228 |
| 2001/0034654 A1* | 10/2001 | L. Vigil | G06Q 30/02 705/14.14 |
| 2002/0000307 A1 | 1/2002 | Denk et al. | |
| 2002/0013725 A1* | 1/2002 | Takakura | G06Q 30/02 705/14.66 |
| 2002/0016736 A1* | 2/2002 | Cannon | G06Q 30/02 705/14.4 |
| 2002/0030741 A1* | 3/2002 | Broemmelsiek | H04N 7/188 348/169 |
| 2002/0095357 A1* | 7/2002 | Hunter | G06Q 20/24 705/7.36 |
| 2002/0169670 A1* | 11/2002 | Barsade | G06Q 30/0248 705/14.47 |
| 2003/0045273 A1* | 3/2003 | Pyhalammi | H04L 67/04 455/412.1 |
| 2005/0038900 A1* | 2/2005 | Krassner | G06Q 30/0207 709/231 |
| 2005/0071228 A1* | 3/2005 | Bortolin | G06Q 30/0238 705/14.27 |
| 2005/0144142 A1* | 6/2005 | Takayama | G06Q 30/06 705/64 |
| 2005/0215238 A1* | 9/2005 | Macaluso | H04W 4/24 455/414.1 |
| 2006/0010928 A1 | 1/2006 | Traenkle et al. | |
| 2006/0074753 A1* | 4/2006 | Schuh | G07F 17/3255 705/14.23 |
| 2006/0100928 A1* | 5/2006 | Walczak, Jr. | G06Q 30/0267 705/14.64 |
| 2006/0190616 A1* | 8/2006 | Mayerhofer | H04L 67/2838 709/231 |
| 2006/0278698 A1* | 12/2006 | Lovett | G06Q 20/24 235/380 |
| 2007/0061146 A1 | 3/2007 | Jaramillo et al. | |
| 2007/0099636 A1 | 5/2007 | Roth | |
| 2007/0184820 A1* | 8/2007 | Marshall | G06Q 30/02 455/414.3 |
| 2007/0262133 A1* | 11/2007 | Park | G06Q 20/04 235/379 |
| 2008/0310510 A1 | 12/2008 | Hiwasa et al. | |
| 2009/0063622 A1* | 3/2009 | Cheng | G06F 16/957 709/203 |
| 2010/0250370 A1* | 9/2010 | Jones | G06Q 30/0269 705/14.66 |
| 2011/0053513 A1 | 3/2011 | Papakostas et al. | |
| 2011/0107363 A1* | 5/2011 | Sanghavi | G06Q 30/0224 725/23 |
| 2011/0161790 A1* | 6/2011 | Junior | G06Q 30/0267 715/205 |
| 2011/0219366 A1* | 9/2011 | Grundfast | G06F 3/048 717/172 |
| 2011/0231265 A1* | 9/2011 | Brown | G06Q 30/02 705/14.73 |
| 2012/0173325 A1* | 7/2012 | Johri | G06Q 20/401 705/14.38 |
| 2012/0259983 A1 | 10/2012 | Nakadai | |
| 2012/0290529 A1* | 11/2012 | Baleedpalli | G06F 16/23 707/609 |
| 2017/0061493 A1* | 3/2017 | Grundfast | G06T 7/0004 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

Abrams, Help users find, interact & re-engage with your app on the Google Assistant, Google Developers Blog, Nov. 15, 2017, 16 pages.

Albrecht, "Alexa, How Can You Be Used in Restaurants?", the spoon, Dec. 10, 2017, 6 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018, 6 pages.

Chen, Lulu Yilun, "Alibaba Challenges Google, Amazon With New Echo-Like Device", Bloomberg Technology, Jul. 5, 2017 (3 pages).

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Crist, Ry, "Logitech Harmony's Alexa Skill just got a whole lot better", cnet, Jul. 13, 2017 (2 pages).

Estes, "Amazon's Newest Gadget Is a Tablet That's Also an Echo", Gizmodo, Sep. 19, 2017, 3 pages.

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

Forrest, Conner, "Essential Home wants to be bridge between Amazon's Alexa, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", cnet, May 20, 2017 (7 pages).

Gebhart, Andrew, "Google Home to the Amazon Echo: 'Anything you can do . . . '", cnet, May 18, 2017 (7 pages).

Gibbs, Samuel, "Your Facebook Messenger app is about to be filled with ads", The Guardian, Jul. 12, 2017 (3 pages).

Golgowski, Nina, "This Burger King Ad Is Trying to Control Your Google Home Device", Huffpost, Apr. 12, 2017 (7 pages).

Google Developers, "GoogleAssistant SDK" reprinted from https://developers.google.com/assistant/sdk/ on Aug. 22, 2017 (4 pages).

Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.

Gurman, et al., "Apple Is Manufacturing a Siri Speaker to Outdo Google and Amazon", Bloomberg, May 31, 2017 (5 pages).

Hardwick, Tim, "Facebook Smart Speaker Coming Next Year With 15-inch Touch Panel", MacRumors, Jul. 25, 2017 (5 pages).

Heater, "Amazon Alexa devices can finally tell voices apart", TechCrunch, Oct. 11, 2017, 6 pages.

Johnston, "Amazon Whirlwind: New Echo, Plus, Spot, Connect, Fire TV Take the Stage", Twice, Sep. 27, 2017, 4 pages.

Kelion, "Amazon revamps Echo smart speaker family", BBC News, Sep. 27, 2017, 11 pages.

Kelion, Leo, "Amazon's race to make Alexa smarter", BBC News, Jul. 28, 2017 (8 pages).

Koetsier, John, "Ads on Amazon Echo: Wendy's, ESPN, and Progressive Among Brands Testing", Forbes, May 11, 2017 (2 pages).

Krishna, "Jim Beam's smart decanter will pour you a shot when you ask", engadget, Nov. 29, 2017, 3 pages.

Lacy, "Improving search and advertising are the next frontiers for voice-activated devices", TechCrunch, Dec. 20, 2017, 13 pages.

(56) References Cited

OTHER PUBLICATIONS

Larson, Selena, "Google Home now recognizes your individual voice", CNN Money, San Francisco, California, Apr. 20, 2017 (3 pages).
Lee, "Take Two for Samsung's troubled Bixby assistant", BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Notice of Allowance on U.S. Appl. No. 13/165,686 dated May 28, 2013. 9 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
U.S. Notice of Allowance U.S. Appl. No. 14/012,500 dated Dec. 18, 2017. 11 pages.
U.S. Office Action for U.S. Appl. No. 14/012,500 dated Feb. 2, 2017. 12 pages.
U.S. Office Action for U.S. Appl. No. 14/012,500 dated Jul. 21, 2017. 19 pages.
U.S. Office Action on U.S. Appl. No. 14/012,500 dated Dec. 3, 2014. 5 pages.
U.S. Office Action on U.S. Appl. No. 14/012,500 dated Jul. 23, 2014. 6 pages.
U.S. Office Action on U.S. Appl. No. 14/012,500 dated May 29, 2015, 5 pages.
U.S. Office Action on U.S. Appl. No. 14/012,500 dated May 12, 2016. 7 pages.
U.S. Office Action on U.S. Appl. No. 14/012,500 dated Nov. 27, 2015. 7 pages.
Willens, Max, "For publishers, Amazon Alexa holds promise but not much money (yet)", Digiday, Jul. 6, 2017 (6 pages).
U.S. Non-Final Office Action for U.S. Appl. No. 15/956,227 dated Jul. 12, 2019, 21 pages.
Notice of Allowance on U.S. Appl. No. 15/956,227 dated Nov. 21, 2019 (12 pages).

\* cited by examiner

MOBILE INTERSTITIAL ADS

CROSS-REFERENCE TO RELATED APPLICATIONS

This application is a continuation of and claims priority under 35 U.S.C. § 120 to U.S. patent application Ser. No. 14/012,500, filed Aug. 28, 2013, titled "Mobile Interstitial Ads," which is a continuation of and claims priority under 35 U.S.C. § 120 to U.S. patent application Ser. No. 13/165,686, issued as U.S. Pat. No. 8,548,848, filed Jun. 21, 2011, titled "Mobile Interstitial Ads," each of which is incorporated herein by reference in its entirety.

FIELD OF ENDEAVOR

The present document relates to methods and mechanisms to improve the user experience for web browsing and data/information access. Specifically, it relates to the identification of content selection situations where interstitial content may be advantageous to keeping the user's attention and to the presentation of that content.

BACKGROUND

The proliferation of online content and resources has led to an attendant increase in online advertising. The difference between an online advertisement and a print or television or billboard ad is that a user may click on an online advertisement and be directed to an advertiser's landing page. This makes online ads an extremely powerful tool because they can allow users to immediately interact with an advertiser and thereby buy goods or services, subscribe to mailing lists, or quickly learn more about products and/or services of interest to them.

The expansion of this online advertising model to mobile devices and internet-capable telephones has extended the reach and impact of advertisers even further. It has also, however, come with a set of problems and concerns that may become especially apparent in the mobile device and mobile telephone realms. One obstacle is that the time interval between user making an ad click and getting to the landing page may be longer than the user can or will wait for a page to load on a mobile device. Since the user has no content to interact with/view, s/he is more likely to leave the page and/or leave the browser entirely when such a delay occurs, resulting in ad/content abandonment.

SUMMARY

This document discusses systems and methods for loading and selectively displaying interstitial content on a mobile device during an anticipated load latency period to hold the user's attention and thereby reduce instances of abandonment. One solution for displaying interstitial content on a mobile device involves pre-loading the interstitial content onto the mobile device such that the interstitial content may be accessed and displayed locally from the device during any load latency for a requested page.

In one variation, such interstitial content may be associated with advertisements that connect to landing pages for the advertiser. In such variations, an advertisement presented on a mobile device may be served to the device with the interstitial content already attached. Such a solution enables advertisers to control and customize the interstitial content experience provided to users based on a wide range of parameters, including device type, network speed, carrier/network type, and a range of other factors.

Some variations may pertain to a method of presenting intervening content on a mobile device while content requested by that device is loading. One variation of such a method may comprise the steps of: identifying a request from the device to load a particular content item on the device; determining an expected load time for the requested content item; selecting at least one portion of intervening content based on the requested content item and the expected load time, where the intervening content is pre-loaded onto the mobile device before said identifying; and presenting the selected intervening content on the mobile device while the requested page loads.

In some variations, the step of determining expected load time may include detecting at least one of device type, service provider, connection type, connection speed, network congestion, and latency factors. In some variations, the step of selecting intervening content may include selecting at least one of several pre-loaded intervening content portions associated with a displayed advertisement used to initiate the advertisement request, where the pre-loaded intervening content portions were loaded onto the mobile device at the same time as the displayed advertisement.

In some variations, one or more portions of intervening content may include static versions of requested web pages. In some variations, one or more portions of intervening content may include video advertisements related to requested content items.

Some variations may pertain to a method of serving intervening content to a mobile device along with an advertisement. One variation of such a method may comprise the steps of: registering an advertisement request from the mobile device; identifying, in response to the advertisement request, at least one advertisement to be served to the mobile device; determining network information associated with the advertisement request; identifying, for the at least one advertisement, at least one item of intervening content to be served to the mobile device along with that advertisement, where the step of identifying includes determining a mobile device type associated with the advertisement request and choosing from only those items of intervening content suitable for display on that device type; associating the identified item of intervening content with the advertisement; configuring the at least one item of intervening content such that it can be presented on a display of the mobile device in response to a click action on the associated advertisement; and delivering the identified at least one advertisement along with at least one associated, configured item of intervening content to the mobile device in response to the advertisement request.

In some variations, the step of determining network information includes detecting at least one of mobile device type, mobile device data service provider, mobile device data connection type, mobile device data connection speed, network congestion, and latency factors.

In some variations, the associated item of intervening content includes a static version of a landing page to which an advertisement is linked. In some variations, the associated item of intervening content includes a video advertisement related to an item advertised in the advertisement.

In some variations, the method may further comprise the steps of: registering an ad selection event from the mobile device, where the ad selection event indicates a selection of a delivered advertisement; registering an intervening content display start event from the mobile device, where the intervening content display start event indicates a start of intervening content presentation on the mobile device; registering an intervening content display end event from the mobile device, where the intervening content display end event indicates an end of intervening content presentation on the mobile device; and assessing a charge to an advertiser associated with the selected ad and the displayed intervening content based on the ad selection event and an intervening content display duration.

In some variations, the step of identifying further includes determining one or more expected wait or latency times for content loading on the mobile device based on the determined network information and choosing from only those items of intervening content suitable for holding a device user's attention for the determined wait or latency times.

Some variations may pertain to a system for serving intervening content to a mobile device along with an advertisement. One variation of such a system may comprise an ads server equipped with at least one memory and at least one processor and configured to register an advertisement request sent to the ads server from a mobile device. Variations of an ads server may include: an ad selector configured to identify, based on the registered request, at least one advertisement to be served to the mobile device, where the at least one advertisement is stored in an ads database accessible by the ads server; an interstitial selector configured to identify, for the at least one advertisement, at least one item of intervening content to be served to the mobile device along with the advertisement, where the process or identifying includes determining a mobile device type associated with the advertisement request and choosing from only those items of intervening content suitable for display on that device type; and an aggregator configured to associate the item of intervening content with the advertisement.

In some variations, the interstitial selector is further configured to adjust the at least one item of intervening content such that it can be presented on a display of the mobile device in response to a click action on the associated advertisement. In some variations, the ads server is configured to determine network information associated with the advertisement request. In some variations, the ads server is further configured to deliver the identified at least one advertisement along with the at least one associated, adjusted item of intervening content to the mobile device in response to the advertisement request.

Some variations may pertain to a computer-readable storage medium having embodied thereon a program which, when executed by one or more computers or computer systems, causes the computers or computer systems to carry out a method of serving intervening content to a mobile device along with an advertisement as described above. Some variations may pertain to a computer-readable storage medium having embodied thereon a program which, when executed by one or more computers or computer systems, causes the computers or computer systems to carry out a method of presenting intervening content on a mobile device while content requested by that device is loading as described above.

Further scope of applicability of the systems and methods discussed will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein.

Figure 1:
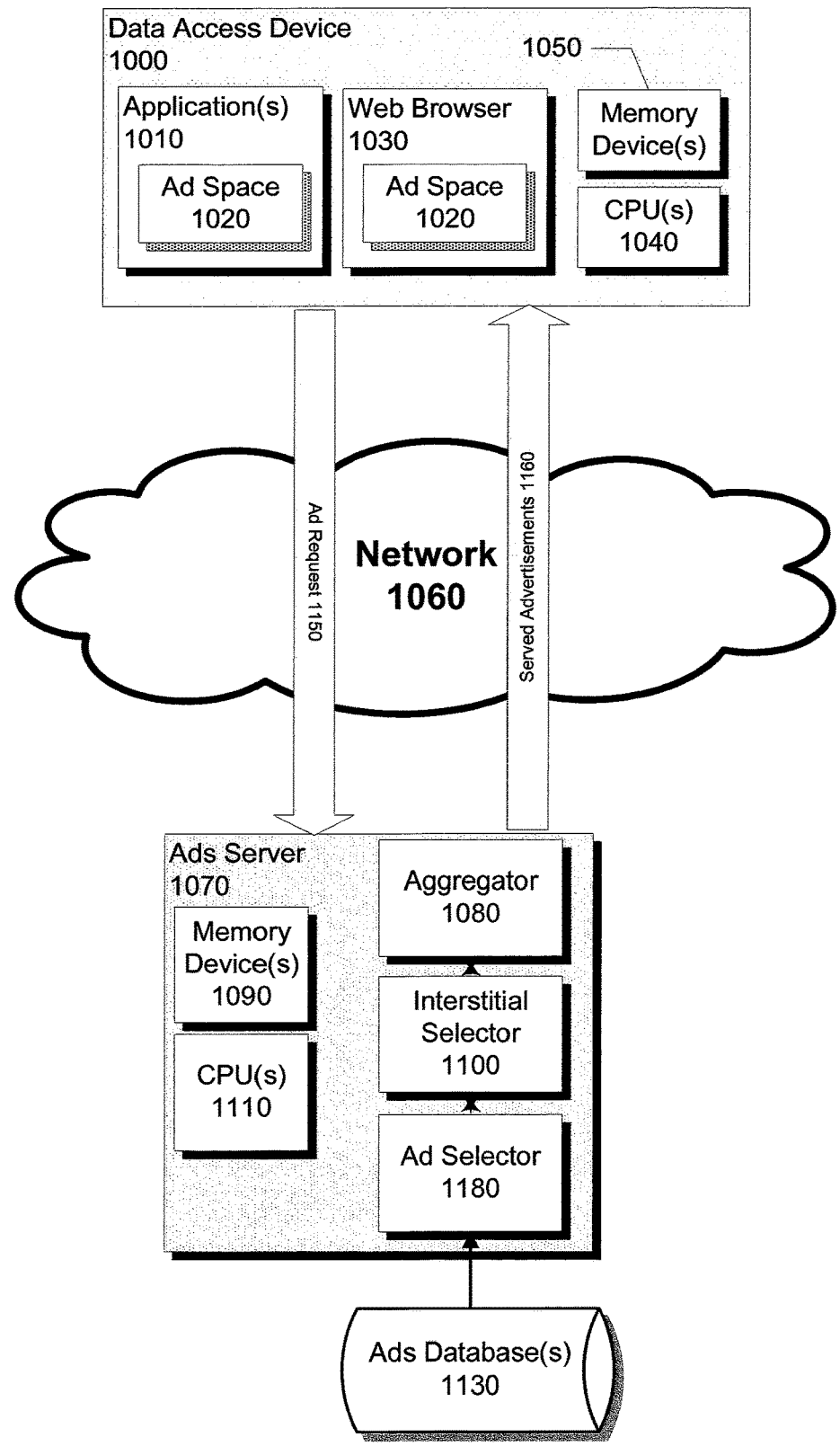
FIG. 1 shows a block diagram of an embodiment of an ads server providing interstitial content-bearing advertisements to a data access device.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

For mobile devices, one of the recurring issues in ad presentation is that the time interval between user making an ad click and getting to the landing page is too long, causing users to leave the browser before the page loads. Previously, issues of ad and/or content abandonment were addressed by creating ads that had landing page previews, which are thumbnails of the landing page the user can look at before looking at the landing page. This gave the user an idea of what to expect once the landing page loads, but did not address the issue of keeping the user's attention during a delayed and/or prolonged page loading process.

When a mobile device sends a page load request to a web server associated with a landing page, there may be a delay or latency between the request and the page load time. Such delay or latency may arise from limitations of the device, the communication network, the server, or some combination thereof. A problem of such latency, especially in a mobile device context, is user abandonment of the page load request. If a page is taking too long to load, and there is nothing else to hold the user's attention in the meantime, they are likely to abandon the request and either put the device away, try to load a different page, or undertake some other action.

A solution to this is showing the user interstitial content during this time interval, when the user is waiting for the landing page to load. Variations of such interstitial content solutions may relate to methods of presenting appropriate intervening content on a mobile device while a web page requested by that device is loading. Variations of such a method may comprise registering a request from the device to load a particular web page on the device. Variations of a request may include a click or selection of a displayed advertisement or web link. Other variations may include automated or automatic requests such as those triggered when a device connects to a particular network or attempts to access a page or site via an app such as a store front end or a content sharing tool.

Yet further variations are possible which change the user interaction. For example: If the landing page is unavailable or too slow, a mobile user may be presented with a call link or navigate link as an interstitial ad. In some variations, this may be facilitated by presenting a click-to-call or click-to-navigate (for driving directions) ad as the interstitial ad. In other variations, interstitial content may resemble a click-to-call ad but may simply be a utility or widget or other component that directs a user's call-capable device to dial a phone number without necessarily connecting to any other outside data or event recognition source.

Further variations of a method may include determining an expected load time for a requested page. Such a determination may be made based on a combination of factors including, but not limited to, the device type and/or device parameters associated with the request, a measured or estimated signal strength and/or network type associated with the request, and any particular carrier or internet service provider associated with the request. Variations of device type and device parameters may include considerations based on a user agent or other source of information about the actual device. Variations may include determining and/or accounting for known screen size/resolution, memory and/or processing power associated with the device. Variations of signal strength and/or network type may include a determination of whether the request was transmitted via Ethernet, bluetooth, cellular data, optical, or some other data transmission method. Variations may also include a determination of how strong or weak a wireless Ethernet or cellular data signal is with respect to the device.

Further variations may include a determination of relative network congestion and latency levels associated with data transmission between the device and the requested page. Variations of carrier and/or internet service provider determination may include accounting for known latency or lag factors associated with the data limitations or data transfer technology type of a particular provider. Yet further variations may include accounting for user preference for a particular mode of interaction. For example if a user is more interested in audio content than text, images, and/or video, interstitial audio content may be specifically selected for the user or may be preferentially ranked/identified when determining a suitable ad or set of ads to serve and/or present as interstitials.

Further variations of a method may include selecting at least one portion of intervening content based on the requested page and the expected load time, where the intervening content is pre-loaded onto the mobile device before the page request is registered. Variations may include loading a range of potential intervening content onto the device along with the link, image, or other feature used to generate a page request. Other variations may include periodically updating the device with potential intervening content for a particular app or loading potential intervening content during app start-up. Other variations may include populating the dns cache of the device beforehand. Such an approach may save on time communicating with a name server, thereby allowing for quicker load times. The DNS data may be included as part of the served interstitial content, or may be served concurrently but in a logically distinct manner.

Variations of an intervening content selection paradigm may include selecting one or more pieces of intervening content based on their expected play time and/or expected length of time they will hold a user's attention as compared to the expected load time. In some variations, intervening content may be selected for display based on expected load time and device capabilities. In such variations, intervening video content may not be shown on devices with poor capability for video playback. In further variations, intervening content may be selected based on specific device type, such that interstitial content made for a device with operating system I will not be shown in conjunction with advertisement content made for a device with operating system A and vice-versa. Also, such a concept extends to general device awareness where content for a device having operating system I is not delivered to a device having operating system A, and vice versa.

Further variations of the method may include presenting the selected intervening content on the mobile device while the requested page loads. Variations of content presentation may depend on device capabilities, device settings, device type, and connection type. In some variations, content may be presented as static images with or without associated text or captioning. In other variations, content may be presented as video with or without associated text or captioning. In yet further variations, content may be presented as audio with or without associated static images and/or video. Variations of static images and/or vide may include screenshots and/or video or interactive demos of the requested page and/or target site or application. In further variations still, the content may be an interactive feature such as a mini-game or a puzzle meant to hold the user's attention.

In variations for touch-screen capable devices such as certain types of smart phones, GPS devices, tablets, and other similar mobile computing devices, some or all of the entire screen may be used to present the content. In variations involving GPS devices or GPS-type applications on a mobile computing device, only part of the screen may be used for display of content whereas the other part of the screen is reserved for ongoing display of GPS directions.

Some variations of interstitial ad serving/loading/embedding may incorporate network detection to determine speed (i.e. detect wife vs. 3 g) and/or carrier and/or device type and decide if static content needs to be shown. This determination can be device-based or carrier-based or carrier-type based. Yet further variations might estimate network load levels to determine current/expected network speed. Yet further variations could also tailor/trigger static content based on expected latency time.

In a user-driven, mobile device example, when a user clicks on an ad in a mobile setting, an interstitial ad can be displayed while the underlying landing page loads. The interstitial ad is loaded along with the clickable ad so that there is no load time for the interstitial ad. In some variations, the interstitial ad itself may be animated and/or otherwise configured to expand and/or seamlessly transform into the landing page. The amount and type of content could be automatically chosen based on the network type or network conditions. The interstitial ads could therefore be intelligently delivered such that they are only shown to people on slow connections or slow load times.

A particular ad may have multiple interstitials based on assorted signals (based on various network speed levels, etc.) An interstitial ad/ad group may also have a cascade sequence/series of content—for instance showing a map indicating a store location, then showing a local offer, then showing the landing page. In such variations, ad frequency is preferably tied to human attention span. Some variations may feed/sequence/cascade information at a rate that keeps user involved retains a user's attention and reduces the chance they will leave the page/ad. Also some variations may include a feature enabling a user to go "back" to interstitial ads from landing page to review things like the local offer or the map.

An embodiment of an ad serving system where an ads server is providing interstitial content-bearing advertisements to a data access device is depicted in FIG. 1. An embodiment of a mobile data access device 1000 may include a mobile telephone, a mobile handheld device such as an iPhone™, Blackberry™, Windows™ phone and/or Android™ phone, a media tablet device, netbook, notebook computer, GPS device, media player device, or some combination thereof or variation thereon.

A mobile data access device 1000 may include one or more memory devices 1050 for storing applications, application data, web pages, images, audio and/or video, device settings and/or preferences, and other information relevant to the operation, use, and potential user(s) of the device. A mobile data access device 1000 may also include one or more processors 1040 to process the information and execute the applications stored in the memory device(s) 1050. Variations of memory 1050 and processor 1040 devices may include magnetic, electronic, and/or optical devices and/or combinations thereof.

Some variations of a data access device 1000 may include a display screen (not shown) and/or a speaker (not shown). Other variations of a data access device may include signal output paths such as wired or wireless connections to external audio and/or video devices such as docking stations, earphones, Bluetooth™ devices, external displays, and other similar information presentation devices.

A mobile data access device 1000 may include one or more applications 1010 such as Windows™, Blackberry™, iPhone™, Android™ or other applications/apps. Some variations of applications 1010 may include designated ad space 1020 for the display of advertisements related to an application or the content/information presented or processed therein. A mobile data access device 1000 may also include one or more web browser tools 1030 for viewing and interacting with web pages via a wired or wireless internet connection and/or via a mobile data exchange connection such as cellular, optical, Bluetooth™, or some combination thereof. Some variations of a web browser 1030 may also include a designated ad space 1020 for the display of advertisements related to web page content, search results, web-based email, map information, and/or geo-temporal factors.

The mobile device may submit advertisement requests 1150 and receive served advertisements 1160 via a communication network 1060 such as the internet, a public, private, wired, and/or wireless local area network (LAN) or wide area network (WAN), a cellular communication network, telephone lines, radio-frequency networks, hard-wired connections, and/or combinations thereof. The ad requests 1150 and served ads 1160 may go to and from an ads server 1070.

An embodiment of an ads server 1070 may be equipped with one or more memory devices 1090 for storing information and one or more processors 1110 for performing data processing operations. The embodiment shown is also equipped with an ad selector portion 1180 that selects and ranks ads from an ads database based on an ad request 1150, an interstitial selector portion 1100 that selects interstitial content to be associated with one or more of the ranked ads, and an aggregator 1080 that attaches the interstitial content to the selected advertisement so that the interstitial content is delivered along with the advertisement during ad serving.

Figure 2:
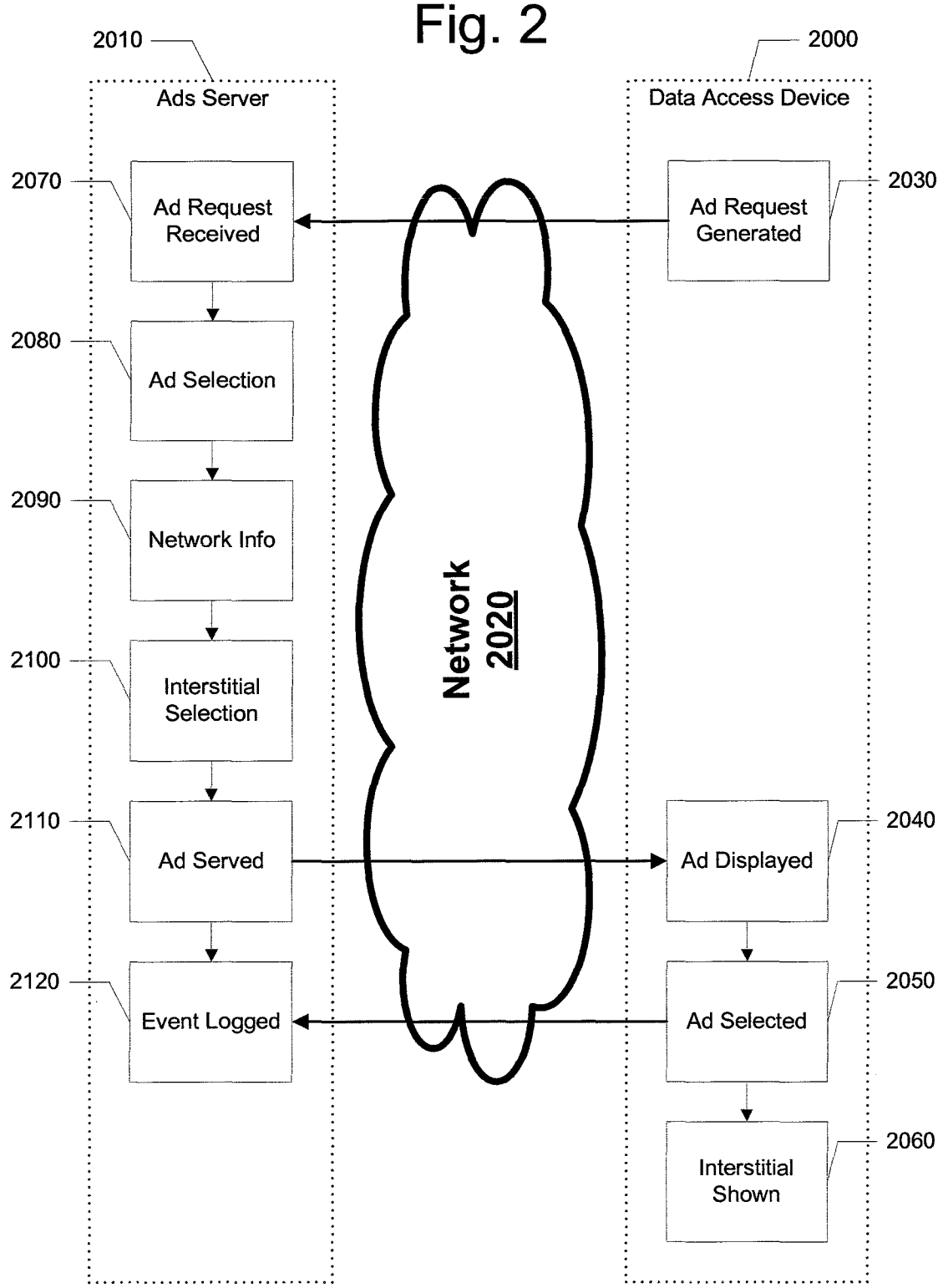
FIG. 2 shows a block diagram of an embodiment of a method of providing interstitial content-bearing advertisements from an ads server to a data access device.

FIG. 2 shows an embodiment of a block diagram of an embodiment of a method of providing interstitial content-bearing advertisements from an ads server to a data access device. In the embodiment shown, an advertisement request may be generated 2030 in a data access device 2000 due to a range of triggering events, including user action, device settings, data connection properties, and application settings. The ad request is transmitted over a network 2020 and received 2070 by an ads server 2010. The server then selects one or more relevant ads 2080 based on the received request 2070. In variations where more than one ad is selected 2080 the selected ads may also be ranked to determine the best or more suitable ad or ads to serve.

In the embodiment shown, a network information detection 2090 operation is also performed on the server side. The network information detection 2090 may include determining a connection speed associated with the data access device 2000 generating 2030 the ad request. Such a connection speed determination may be performed using known techniques such as ping tests that observe response from a site or domain with a benchmark time. Variations of network information detection 2090 may also include determining a network type associated with the data access device. Determining a network type may include determining whether, for example, a mobile device is operating from a wired or wireless internet connection, or from a cellular data connection. Such network type information may be determined based on a carrier type, originating IP address, routing history, or other information associated with the advertisement request 2030. In some variations, information identifying a particular data access provider and/or carrier may be embedded or otherwise included in the advertisement request 2030.

Further variations of network information detection 2090 may include estimations of network load and congestion levels that may reduce or otherwise degrade data transmission capability between the data access device and one or more potential landing pages based on the selected ad or ads 2080. Such estimations may, in some variations, be accomplished by tracing a route back to the device 2000 originating the request 2030 and estimating load levels based on routing time. Similar estimations may be performed for possible data transfer routes between the originating device 2000 and one or more potential landing pages. Estimations may also take into account geo-temporal factors and overall network load and congestion levels based on known or expected peak traffic times for a given region where the device 2000 or one or more potential landing pages may be located/hosted.

After selecting one or more ads 2080 and, in network detecting embodiments, detecting at least some portion of the communication network information 2090 associated with the advertisement request, interstitial content may be selected 2100 for one or more of the selected ads. Interstitial content selection may be accomplished via a hardware and/or software component operating as part or all of the interstitial selector 1100 at the ads server 1070.

Variations of interstitial content selection may include a selection and ranking approach similar to that used for ads, where relevant and/or device/connection appropriate interstitial content is selected from an interstitial content repository (which may be part of or distinct from an ads database). In some variations, interstitial content may include static content such as slide sequences showing part or all of a landing page, information about local offers from the advertiser, video clips, animated sequences, interactive demos, games, and combinations thereof.

Identification and selection of interstitial content may be based on parameters and identifying information associated with the ad request and, in some embodiments, with the network identification results. The interstitial selector 1100 may receive part of all of this information as inputs to help select appropriate/suitable interstitial content.

In situations where an advertiser has specific local offers related to a certain region, and the ad request is identified as coming from a device and/or user located in that region, such locale information may be used to select interstitial content to show that local offer. In situations where an estimated landing page load time for an ad is estimated at above a certain threshold time, the interstitial selector 1100 may select a video sequence, one or more slideshow sequences, and/or games or demos for the interstitial content to hold the user's attention during page loading. In situations where the advertisement request is indicated as being generated 2030 on a requesting device has limited memory, processing, and/or content display capabilities, only interstitial content that can be suitably and properly displayed on the device may be selected. Such device capability information may be contained, in some variations, in user agent information associated with the advertising request.

In further variations, interstitial content may be selected based on the ad request itself. For example, an ad request related to shoes may result in selection and serving of an ad from a large department store, but the interstitial content associated with that department store may span a whole range of goods and market areas. Since the ad request is related to shoes, interstitial content related to shoe sales in that department store will preferably be selected. In yet further variations, combinations of the above selection criteria may be employed to select the most appropriate interstitial content in terms of duration, relevance, and displayability on the requesting device.

In further variations of interstitial content selection 2100, the interstitial content may be embedded into or otherwise attached to the advertisement so that the interstitial content is loaded onto the requesting device at the same time as the ads. In other variations, the interstitial content may be associated and/or attached to its associated ad in an intermediate step between the interstitial content selection 2100 and ad serving 2110 steps. In yet other variations, the interstitial content may be associated and/or attached to its associated ad during ad serving 2110.

During the ad serving step 2110, one or more ads, along with their associated interstitial content, are transmitted via the network 2020 to the requesting device 2000, and the ad serving event is subsequently logged 2120 at the server side to create a record of the ads and interstitial content served, and the circumstances of the ad serving. The requesting device receives and then presents 2040 the served ad(s). When a presented ad is selected 2050, the ad selection event is transmitted to the server side 2010 for logging 2120 and the interstitial content loaded onto the device along with the ad(s) is displayed 2060 while the landing page associated with the ad is loaded.

Figure 3:
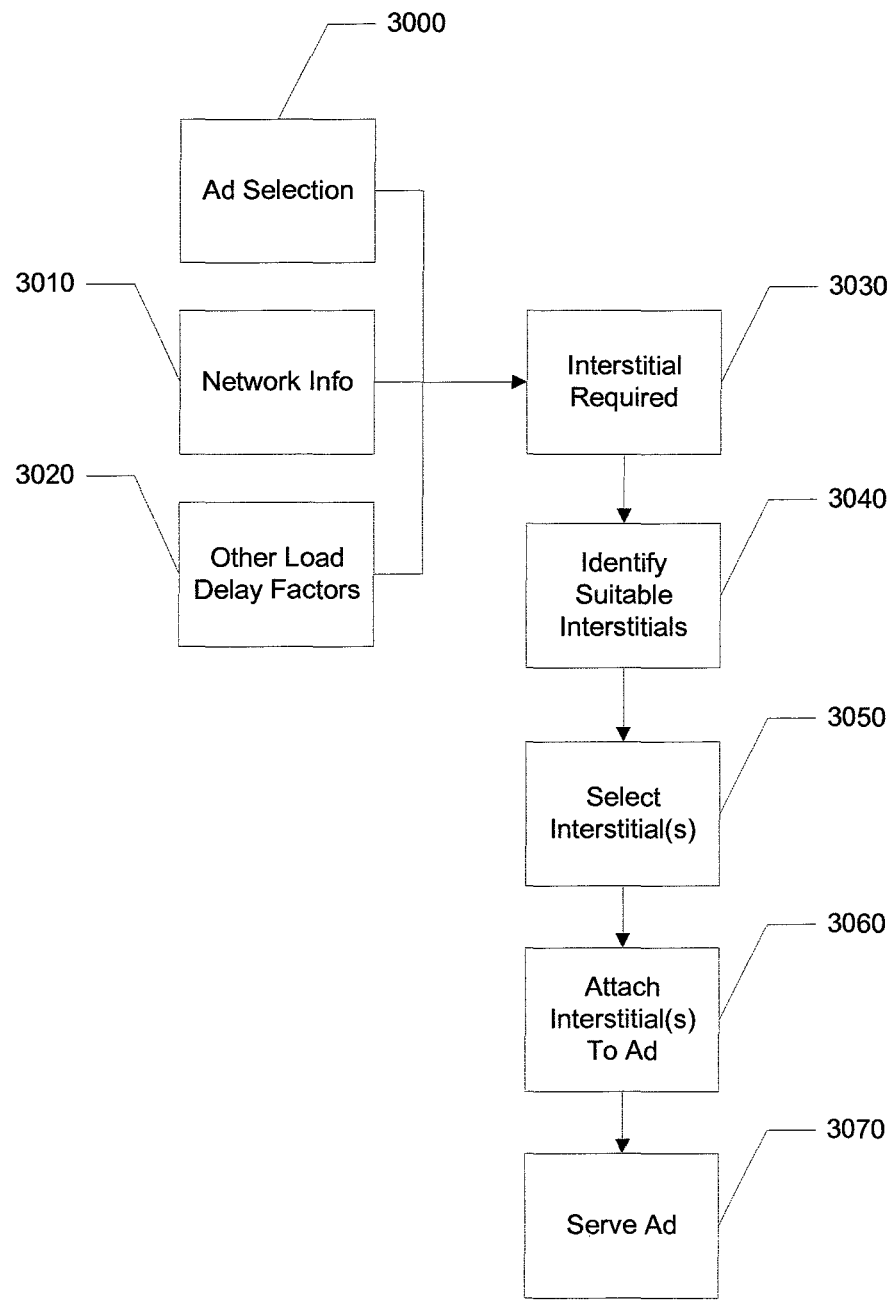
FIG. 3 shows a block diagram of an embodiment of an interstitial content selection method.

FIG. 3 shows a block diagram of an embodiment of an interstitial content selection method. The method determines if interstitial content is required 3030 based on a combination of the advertisement in question 3000, the related network information associated with the advertisement request 3010, and any other relevant load or delay factors 3020 such as known or anticipated limitations of the requesting device, known and/or measured/anticipated delays and/or data restrictions associated with the ad landing page, and/or user preference for a particular type of interaction (video vs. audio vs. text, etc.). In some variations, user preferences may be indicated directly in a user account or profile associated with a particular advertisement request and/or browsing or data access session. In other variations, user preferences may be inferred based on prior data access activity such as a tendency to view or avoid videos on news media sites or similar behavior within a data access session and/or across multiple data access sessions. Such inferential data is only collected and used with user consent, anonymized to prevent identification of a particular user, and subject to deletion either at user request or after a specified period of time.

The advertisement in question 3000 is preferably an advertisement that has associated interstitial content. In some variations, however, an advertiser may allow for the display of interstitial content from related, co-branded or otherwise related goods or services. An advertisement for a department store, for instance, may allow for manufacturers of good or products sold in the department store to associate their interstitial content with advertisements for the store.

For example, a large department store having a sale on shoes may allow various footwear brands to associate and attach relevant interstitial content about their shoes to ads about the department store's shoe sale. In yet further variations, advertisers may allow wholly unrelated, non-competing providers of goods or services to associate interstitial content with their advertisements. For example, an advertisement for a particular video game system and/or video game may allow for association of interstitial content related to local take-out or food delivery merchants.

Network information 3000 may also inform interstitial content not only by identifying suitable and suitably displayable content, but by providing context for the interstitial content. In some variations, a request from a device on a cellular data connection may indicate the cellular provider and thereby indicate either the selection or suppression of certain interstitial content, such as content related to competing cellular providers and/or current offers by that cellular provider.

Once it is determined that interstitial content is required 3030, suitable interstitial ad(s) are identified 3040, and then ranked and selected 3050. Interstitial content may be identified 3040 based on a variety of factors including keywords associated with the selected advertisement 3000 and also from the ad request itself (not shown). Interstitial content may also be identified 3040 based on known or determined device capabilities 3020 as well as latency and delay issues associated with one or more parts of an overall communication network 3010. Interstitial content selection 3050 from among the identified 3040 interstitial ads may be done according to a ranking scheme. Some or all portions of interstitial content and/or interstitial ads may be ranked or otherwise put into a preference order in multiple ways.

In variations where some direct interaction and or explicit preference signal is involved, such as deliberate use of plus-box expansions and/or other affirmatively-triggered content, such signals and/or interactions may be considered as a relevant factor for ranking the interstitials. In variations where there is related ad conversion data or conversion signaling available for either interstitial content or for ads previously associated with particular interstitial content, past, predicted, or estimated/inferred conversion rates may be used to rank or otherwise sort interstitial content.

In further variations, percentage traffic experiments may be conducted and/or traffic data may be collected to determine the performance of interstitial ads. Better performing interstitials may then be selected and/or given an improved ranking/rating based on such performance data. Yet further variations may involve user-based signals such as click-through rates (i.e. did the user actually watch the content and/or did the content hold the user's attention until the landing page was available/loaded), specific user preferences (i.e. video vs. still images vs. text vs. audio), In some variations, an interstitial ad and/or content sequence may include a progress bar for the landing page. Such a progress bar may provide an approximate (or, in some cases, actual) measure of how long until a landing page becomes available and change into a link and/or clickable feature, or otherwise activate a selectable feature/link that allows the user to navigate to the landing page. Such a variation may enable a user to skip certain portions of interstitial content if the landing page loads more quickly than expected, or may provide a user with an up-front estimate of load time for the landing page, making the user more likely to wait for the progress bar to fill in while the page loads. Variations of a progress bar may be connected to incoming/delivered landing page data as compared to a known size of the landing page, allowing such a progress bar to fill in more quickly or more slowly based on data arrival speed and to be filled in completely once the landing page is loaded and ready for rendering on the device.

Such ranking techniques may be necessary in situations where an advertiser has provided multiple items of interstitial content to be shown along with their ads and/or associated ads. In some variations, an advertiser may provide video interstitials, audio-only interstitials, text interstitials, and/or still image interstitials. A ranking scheme/hierarchy may be developed for such assortments of interstitial content by random sampling: showing the ad formats an equal percentage of times and/or to an equal percentage of devices and measuring their relative performance. A ranking scheme may also be developed for such assortments of content by device-based ranking. Such an approach would look for display device originated signals for identifying preferred ad formats.

The selected 3050 interstitial content is then attached to or associated with 3060 the advertisement that will trigger its display. In some variations, the interstitial content is attached directly to the advertisement such that it is part of the same file as the displayed ad. In other variations, the interstitial content may be one or more separate files associated with the advertisement such that when the ad is selected or otherwise interacted with, this will trigger the display of the interstitial content. Once the interstitial content is associated with the advertisement 3060, the ad and the associated interstitial content are served 3070 to the requesting device.

Figure 4:
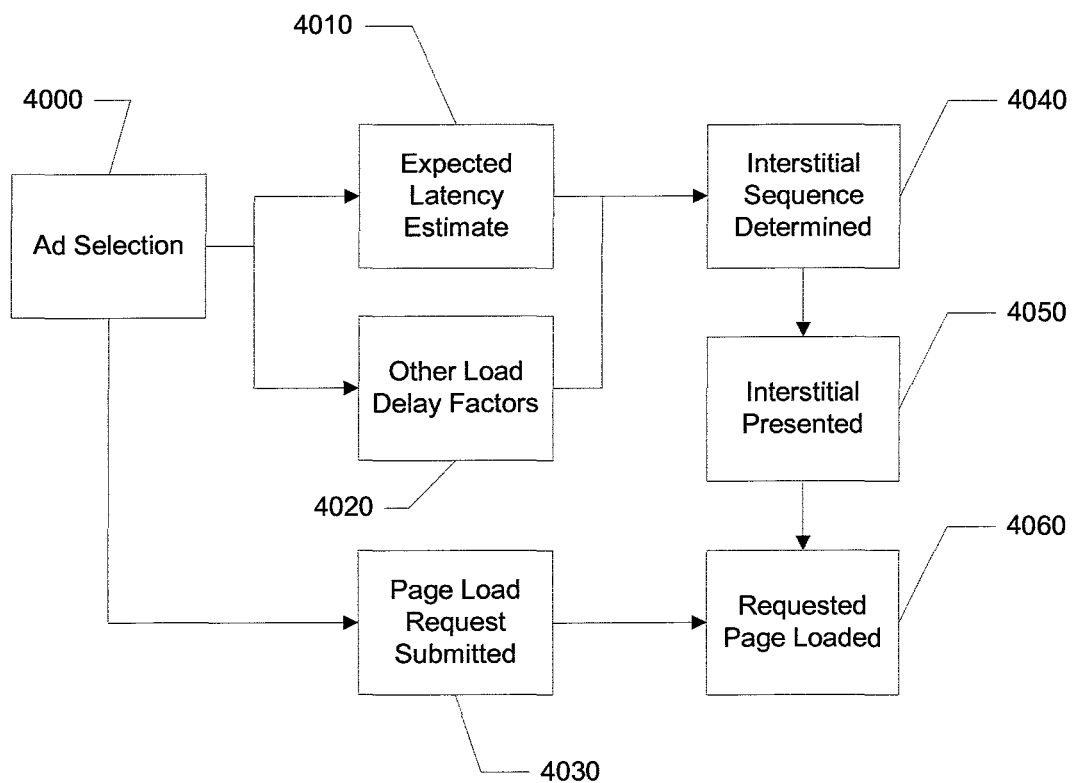
FIG. 4 shows a block diagram of an embodiment of an interstitial content presentation method.

FIG. 4 shows a block diagram of an embodiment of an interstitial content presentation method. In the variation shown, the method begins with an affirmative act on the part of a device user to select an ad 4000. Such an affirmative act may be a click, a screen tap, shaking the device, giving a voice command, sliding a finger or pointing device or cursor in a particular direction, pressing a specific device button, or any number of other similar or related modes of interaction. In some variations, the interstitial sequence associated with an advertisement may be determined at the ad server side, so ad interaction 4000 in such a variation may simultaneously trigger a page load request 4030 for the ad landing page and presentation of interstitial content 4050 during the page load request until the requested page loads 4060. In such a variation the steps of estimating expected latency time 4010, determining other load delay factors 4020 and determining an interstitial content display sequence 4040 may occur during the interstitial content identification 3040 and selection 3050 steps on the server side.

In other variations, a suite of suitable interstitial content may be loaded onto a requesting device along with a served ad, and determinations about expected page load delays and interstitial content display sequence may be carried out on the requesting device. In such variations, an expected latency time 4010 may be estimated by the device when the request for the landing page is submitted 4030. Such expected latency may be estimated by the device by performing a ping test or otherwise attempting to trace a transmission route between itself and the landing page. Latency calculation factors may also include known memory and processing limitations of the device in relation to loading, rendering, and presenting images, video, and other content. In addition to expected latency due to network congestion and relevant device limitations, other delay load factors 4020 such as number of network hops and data connection type/speed may be estimated and/or determined. Once the latency 4010 and any other relevant delay factors 4020 are determined and/or estimated, an appropriate sequence of display for part or all of the interstitial content connected to the ad may be determined 4040.

In further variations, an initial estimated delay and device capability determination may be made at the server side to identify a range of suitable interstitial content whereas a better estimate of latency 4010 and other delay factors 4020 may be performed on the device at the actual landing page request 4030 time. Variations of such server-side determination may include detecting network congestion levels and delay/latency on one or more transmission routes between the requesting device and the landing page associated with a served advertisement by techniques such as ping tests and/or route tracing. Further variations of server-side determination may include accounting for known memory and processing limitations of the requesting devices, estimates of a current access rate/user load on the landing page associated with the ad, and/or determination of the data connection type and data input/output capacity of the requesting device and/or of the landing page.

Variations may use partial server-side latency determination to reduce/ease computational load on a requesting device during subsequent interstitial content presentation. In some variations, the entire latency estimation may be conducted at the server side based on the premise that network conditions are unlikely to change much between an ad serving time and an ad selection time. In other variations, partial latency determination may be made at the server side on the basis of known limitations associated with the requesting device, whereas actual network conditions may be determined by the requesting device upon ad selection.

For variations of interstitial content that include one or more static "slideshow" type displays or other cascaded sequences of content, some or all of the interstitial content may be presented 4050 or suppressed depending on the determined interstitial sequence 4040 at the device level. In some variations, a video sequence may be included in the interstitial content and the sequence determination 4040 may show a long or short version of the video. The video itself may have sequence/display information related to variable video lengths, such that the same video may be displayed with omitted portions to reduce the length of display time without negatively impacting the overall cohesiveness of the video.

Yet further variations of interstitial content may be intended specifically for call-capable devices. In such variations, the interstitial content may be a click-to-call ad that includes the phone number of a store or merchant associated with the advertisement landing page. In variations where the landing page belongs to a merchant with multiple locations, the phone number presented may be for the location closest to the location of the requesting device. Such interstitial ads may enable users who wish to look up basic information (such as business hours) to simply initiate a call from the interstitial ad in the event the landing page load time is too long.

Some variations of interstitial content presentation may also include charge models based not only on cost-per-click, where an advertiser is charged on a per-click basis when the user clicks on their ad, but also on a cost-per-minute or cost-per-unit-of-content model for the interstitial advertisement. In such variations, the ad click may cause the data access device 1000 to send a message to the ads server 1070 indicating that an ad click operation took place on the device. Such information allows the advertiser to be charged the per-click cost. In yet further variations, such ad click and cost-per-click information may also be computed for clickable or otherwise interactive interstitial content, such as click-to-call interstitials.

In variations where an advertisement is associated with interstitial content, and that interstitial content is presented upon ad click, the message to the ads server 1070 may identify the clicked-on ad as one that was configured and intended to present interstitial content. In such variations, at the conclusion of interstitial content presentation the data access device 1000 may send another message to the ads server indicating a duration of content presentation and/or a number of slides/frames of interstitial content shown. Such information may enable a cost-per-minute charge or a cost-per-unit-of-content charge to be assessed to the advertiser for the presentation of interstitial content to a device user.

Only exemplary embodiments of the present invention are shown and described in the present disclosure. It is to be understood that the present invention is capable of use in various other combinations and environments and is capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

We claim:

1. A system for presenting content in networked environments, comprising:
    at least one server having one or more processors and memory, configured to:
        provide, to a client device via a network connection with the server, a first content item linked to a second content item;
        identify a request from the client device to load the second content item to be presented on the client device responsive to an interaction with the first content item at the client device;
        select a third content item for presentation on the client device; and
        send, to the client device, the third content item, the content item when executed configured to cause the client device to:
            present third content item prior to presentation of the second content item,
            present an indicator identifying an amount of time left until the second content item is available for presentation, and
            enable an actionable item responsive to determining that the amount of time left satisfies a threshold, the actionable item configured to cause the client device to present the second content item in response to an interaction with the actionable item subsequent to enabling the actionable item.

2. The system of claim 1, wherein the at least one server is further configured to determine the amount of time by performing at least one of: a ping test to a source of the second content item; tracing a transmission route to the source; calculating a number of network hops to the source; detecting a data connection type and connection speed associated with the client device; and accounting for memory and processing limitations of the client device in relation to loading, rendering, and presenting content.

3. The system of claim 1, wherein the at least one server is further configured to determine the amount of time based on detecting at least one of a device type of the client device, a service provider, a connection type, a connection speed, and a network congestion.

4. The system of claim 1, wherein the at least one server is further configured to provide the first content item to the client device, in response to the client device initiating an application for presenting content.

5. The system of claim 1, wherein the at least one server is further configured to select a type of content for the third content item based on at least one of a device type of the client device, a connection speed with the client device, and an application running on the client device to present the third content item.

6. The system of claim 1, wherein the third content item includes one of a static version of the second content item of a video version of the second content item.

7. A system for presenting content in networked environments, comprising:
    a client device having one or more processors and memory, configured to:
        receive, via a network connection with the client device, a first content item linked to a second content item;
        transmit, via the network connection, responsive to an interaction with the first content item on the client device, a request for the second content item to be presented on the client device subsequent to the first content item;
        receive, via the network connection, a third content item subsequent to transmission of the request for the second content item;
        present the third content item prior to presentation of the second content item;
        present an indicator identifying an amount of time left until the second content item is available for presentation;
        enable an actionable item responsive to determining that the amount of time left satisfies a threshold,
        present, responsive to an interaction with the actionable item subsequent to enabling of the actionable item, the second content item.

8. The system of claim 7, wherein the client device is further configured to determine the amount of time for the second content item based on a partial determination performed on the server, the partial determination including at least one:

performing a ping test to a source of the second content item; tracing a transmission route to the source; calculating a number of network hops to the source; detecting a data connection type and connection speed associated with the client device; and accounting for memory and processing limitations of the client device in relation to loading, rendering, and presenting content.

9. The system of claim 7, wherein the client device is further configured to identify the the amount of time for the second content item by receiving an indication of the selection from the server.

10. The system of claim 7, wherein the client device is further configured to sequentially present a plurality of portions of the third content item while retrieving the second content item.

11. The system of claim 7, wherein the third content item includes one of a static version of the second content item of a video version of the second content item.

12. A method of presenting content in networked environments, comprising:

providing, to a client device via network connection, a first content item linked to a second content item;

identifying, a request from the client device to load a second content item to be presented on the client device responsive to an interaction with the first content item at the client device; and providing, by at least one server, a third content item to the client device, the third content item when executed configured to cause the client device to:

present the third content item for the length while prior to presentation of the second content item, present an indicator identifying an amount of time left until the second content item is available for presentation, and enable an actionable item responsive to determining that the amount of time left satisfies a threshold, the actionable item configured to cause the client device to present the second content item in response to an interaction with the actionable item subsequent to enabling the actionable item.

13. The method of claim 12, further comprising determining the amount of time by performing at least one of: a ping test to a source of the second content item; tracing a transmission route to the source; calculating a number of network hops to the source; detecting a data connection type and connection speed associated with the client device; and accounting for memory and processing limitations of the client device in relation to loading, rendering, and presenting content.

14. The method of claim 12, further comprising determining the amount of time based on detecting at least one of a device type of the client device, a service provider, a connection type, a connection speed, and a network congestion.

15. The method of claim 12, further comprising providing the first content item further comprises providing the first content item to the client device, in response to the client device initiating an application for presenting content.

16. The method of claim 12, further comprising selecting, by the at least one server, a type of content for the third content item based on at least one of a device type of the client device, a connection speed with the client device, and an application running on the client device to present the third content item.

* * * * *